United States Patent [19]

Stemme et al.

[11] 4,128,322
[45] Dec. 5, 1978

[54] INSTANT-PICTURE CAMERA

[75] Inventors: Otto Stemme, Munich; Peter Lermann, Narring, both of Fed. Rep. of Germany

[73] Assignee: Agfa-Gevaert AG, Leverkusen, Fed. Rep. of Germany

[21] Appl. No.: 791,986

[22] Filed: Apr. 28, 1977

[30] Foreign Application Priority Data

Apr. 29, 1976 [DE] Fed. Rep. of Germany ....... 2618989

[51] Int. Cl.² .............................................. G03B 17/50
[52] U.S. Cl. ..................................... 354/83; 354/187; 354/219; 354/288
[58] Field of Search ..................................... 354/83–86, 354/187, 192–194, 208, 219, 288

[56] References Cited

U.S. PATENT DOCUMENTS

| 3,886,570 | 5/1975 | Asano et al. .......................... 354/86 |
| 3,941,464 | 3/1976 | Waaske ................................ 354/219 |

FOREIGN PATENT DOCUMENTS 2062002  7/1972  Fed. Rep. of Germany ........... 354/219

Primary Examiner—John Gonzales
Attorney, Agent, or Firm—Michael J. Striker

[57] ABSTRACT

A camera body has an upper end provided with a slot and with a film chamber which is so dimensioned that it can receive an instant-picture film pack of rectangular shape in such an orientation that those narrow edges of the film sheets adjacent which each sheet has a compartment containing a supply of developer, are located beneath and adjacent to the film slot through which each exposed film sheet is expelled.

8 Claims, 9 Drawing Figures

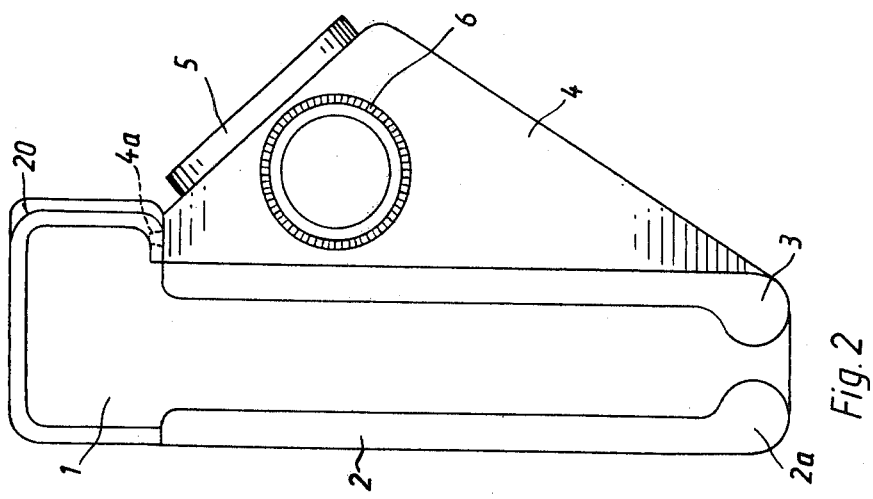
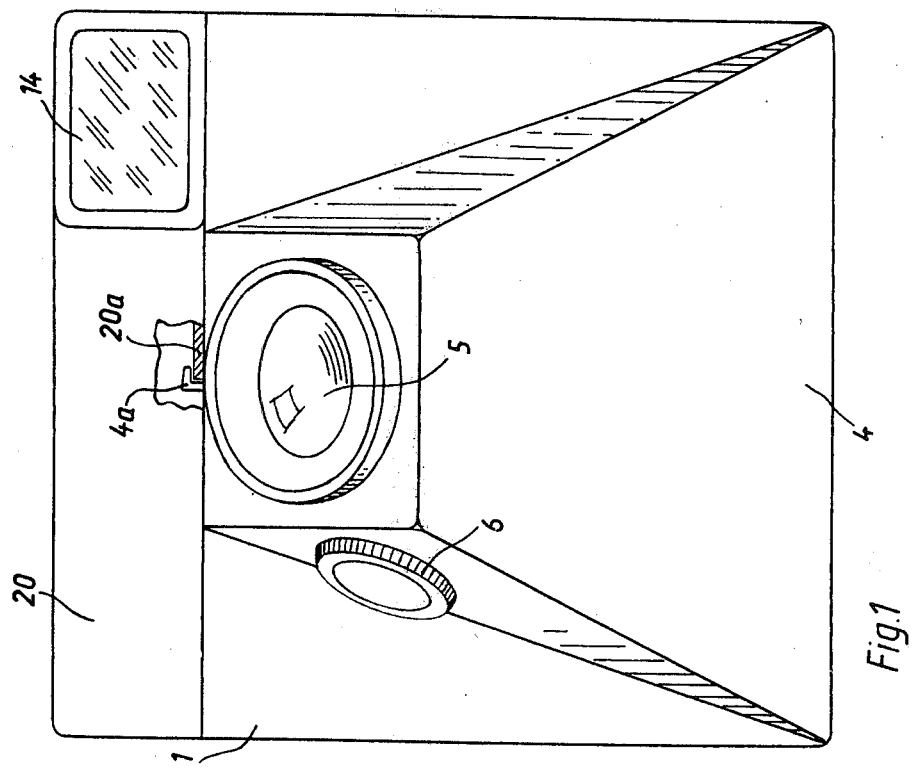

INSTANT-PICTURE CAMERA

BACKGROUND OF THE INVENTION

This invention relates to a camera, and more particularly to an instant-picture camera.

Cameras of this type are known (Polaroid, Kodak). They use film packs or cassettes which contain individual film sheets of rectangular outline; these sheets have along one of their two narrow edges a pouch or compartment which contains a supply of developer. When the individual sheet is exposed, the developer is spread over the sheet to develop the photographic image thereon. Such film packs are well known per se and require no further description; the technical details of the film sheets themselves are of no importance for the present invention.

One of the prior-art cameras proposed for use with such film packs suggests that the film sheets be exposed from one side and that the image thereafter be made visible at the other side by known-per-se diffusion processes.

As a general rule it is desirable for aesthetic reasons that the relatively wide edge portion of the finished photograph, which remains blank because this is where the developer-containing compartment or pouch was located prior to exposure and developing of the film sheet, be located at the lower edge of the photograph where a viewer will find it to be least noticeable and disturbing. If this is to be achieved in the camera mentioned above it is necessary to provide a special exposure arrangement. With respect to the camera in question, it has been proposed to insert the film pack in such a manner that its actual front side faces rearwardly in the camera, and to direct scene light to the film sheets via two cooperating mirrors. This, however, necessitates a camera shape which is exceptionally unhandy and aesthetically displeasing, quite aside from the fact that the use of two mirrors to channel scene light to the film sheets, and the elements needed in conjunction with the mirrors, make for a relatively complicated and expensive construction.

SUMMARY OF THE INVENTION

It is an object of the present invention to avoid the prior-art disadvantages.

More particularly, it is an object of the invention to provide a camera of the type under discussion which can accommodate film packs in the desired manner (so as to yield finished photographs in which the blank strip is located at the bottom) but which does not require the use of scene-light deflecting mirrors.

Another object is to provide such a camera which is relatively simple and very reliable.

A concomitant object is to provide a camera of this type which is of a handy-to-use format and, at least in its closed position, is relatively small.

In pursuance of these objects, and of others which will become apparent hereafter, one feature of the invention resides in an instant-picture camera of the type using a film pack which comprises rectangular film sheets each of which is provided with a supply of developer in a compartment extending along one of the narrow edges of the sheet and arranged to be squeezed upon exposure of the sheet, the camera includes a camera body having an upper end provided with a slot for discharging of exposed sheets, and a film chamber dimensioned to receive a film pack with the compartments located beneath and adjacent to the slot; and a cover for the film chamber to permit insertion and removal of the film pack.

In contradistinction to all prior proposals the slot through which the finished photograph is expelled, is located in the upper end wall of the camera. This is possible, in accordance with the invention, by having a channel-shaped cap straddling the upper end, and by having this cap being slidable transverse to the optical axis of the lens (and hence of the camera) to and from a position in which it exposes that slot. A viewfinder (advantageously of the direct-view or eyelevel type) is mounted in one end portion of the cap so that it is exposed for use when the cap is in the position in which the slot is exposed. In the prior art, it is not possible to locate the slot in this manner because the viewfinder is in the way. Even if the viewfinder were to be relocated to one side of the camera body in the prior art, this would not be satisfactory because it would then further increase the dimensions of the already bulky prior-art camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a front view of a camera according to the invention in collapsed (i.e., rest) position;

FIG. 2 is a side view of the camera in the position of FIG. 1;

DESCRIPTION OF THE PREFERRED EMBODIMENTS

Figure 6:
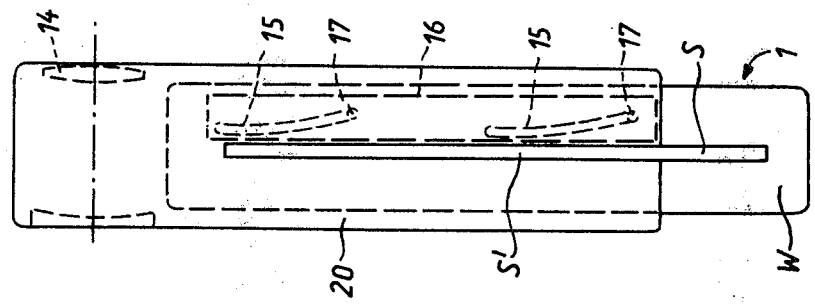
FIG. 6 is a top-plan view of the camera in the position of FIG. 3.
Figure 7:
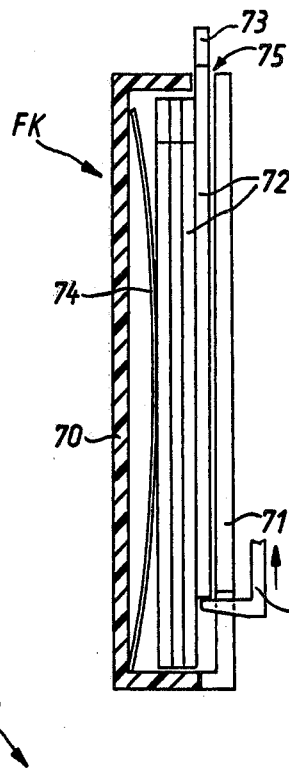
FIG. 7 is a section through a film pack.
Figure 8:
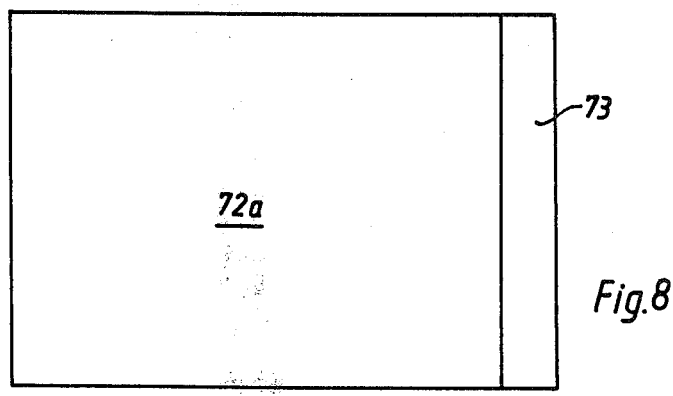
FIG. 8 is a plan view of a single film sheet of the type accommodated in the film pack.

Before discussing the camera as illustrated in FIGS. 1-6, a discussion of the film pack and film sheets shown in FIGS. 7 and 8 will be helpful to facilitate understanding of the invention. It should be borne in mind that the film pack and film sheets shown in these Figures are not new and do not form a part of the invention; they are being discussed only to make it clear why it is desired that the novel camera be able to accept the film pack in a certain orientation.

With this in mind it will be seen that the film pack FK (FIG. 7) has a casing 70 the front side of which is provided with an opening, cut-out or the like 71. One end of the casing 70 has a slit 75 through which film sheets 72 which are stored in the casing (and exposed through opening 71) are expelled from the casing. A spring 74

(or equivalent biasing means) usually is provided to feed the sheets towards the opening 71 and thus into a position in which they can be withdrawn through the slit 75.

Along one of its narrow sides each of the rectangular film sheets 72 has a pouch or compartment 73 (FIG. 8) which contains a supply of developer. Suitable rollers squeeze the developer out of the compartment 73 subsequent to exposure of the film sheet 72 and cause spreading onto the same to effect developing of the image. The finished photograph will have a surface area corresponding to the portion 72a of the film sheet; along one narrow edge it will have a blank (i.e., non-image-bearing) portion corresponding in size and outline to the (now empty) pouch 73. This is aesthetically least objectionable if it is located at the bottom of the photograph; i.e., if it is in the position which it will assume if one rotates the sheet 72 in FIG. 8 through 90° in clockwise direction.

With this information as background, the camera of the invention — as shown in FIGS. 1–6 — can now be discussed.

Figure 4:
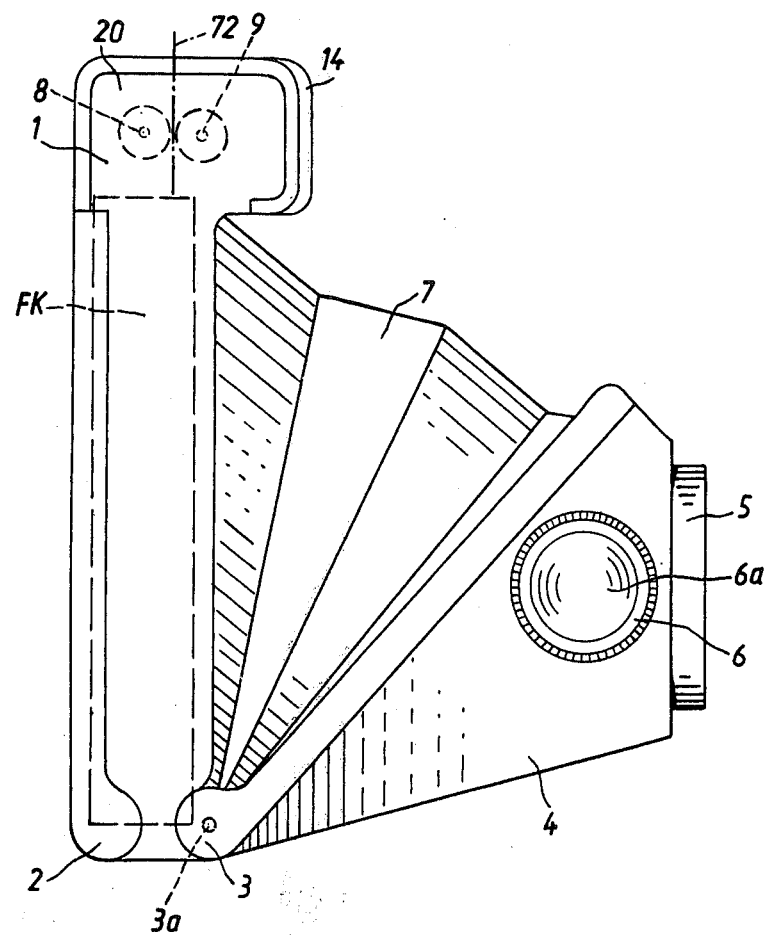
FIG. 4 is a side view of the camera in the position of FIG. 3.

The camera has a body 1 the interior of which forms a film chamber C (FIG. 5) which is accessible via a cover or door 2 that is hinged to body 1 at 2a, or which can be otherwise secured thereto. As shown in FIG. 4, the film chamber is so dimensioned that it can receive the film pack (film cassette) FK in upright position, i.e., in the position of FIG. 7 in which the pouches 73 of the film sheets 72 in pack FK are located uppermost.

Since the developer must be squeezed from the pouches 73 so that it can spread over the area of the portion 72a (FIG. 8), a pair of developer rollers 8 and 9 is provided in the upper part of body 1; the film sheets 72 must pass between these rollers (FIG. 4) which squeeze the developer out of the pouches 73.

From the rollers 8, 9 the film sheets 72 then exit through the slot S provided in the upper wall W of the camera body 1 (see FIG. 6). This arrangement, i.e., the fact that the film sheets travel in this manner to and exit in vertical direction from the slot S, makes it possible to obtain photographs in which the blank strips resulting from squeezing-out of the pouches 73, are located at the bottom end of the respective photograph. In other words: the strip 73 emerges first through the slot S and is followed by the upside-down photograph.

Photographs made with the film sheets 72 are relatively large; the camera, however, is desired to be as small as possible, at least in its rest position, i.e., when it is not in use. According to the invention this is achieved by making the camera collapsible between the open position of FIG. 4 and the closed position of FIG. 2. For this purpose the objective (lens) 5 (together with its not-illustrated shutter) is mounted on a rigid carrier or lens mount 4. One edge portion 3 of the mount 4 is secured to the lower end of body 1 for pivoting about the axis 3a. A foldable bellows 7 is connected to the body 1 and to the mount 4 with which latter it resembles (in the open camera position) essentially the shape of a truncated pyramid.

Figure 3:
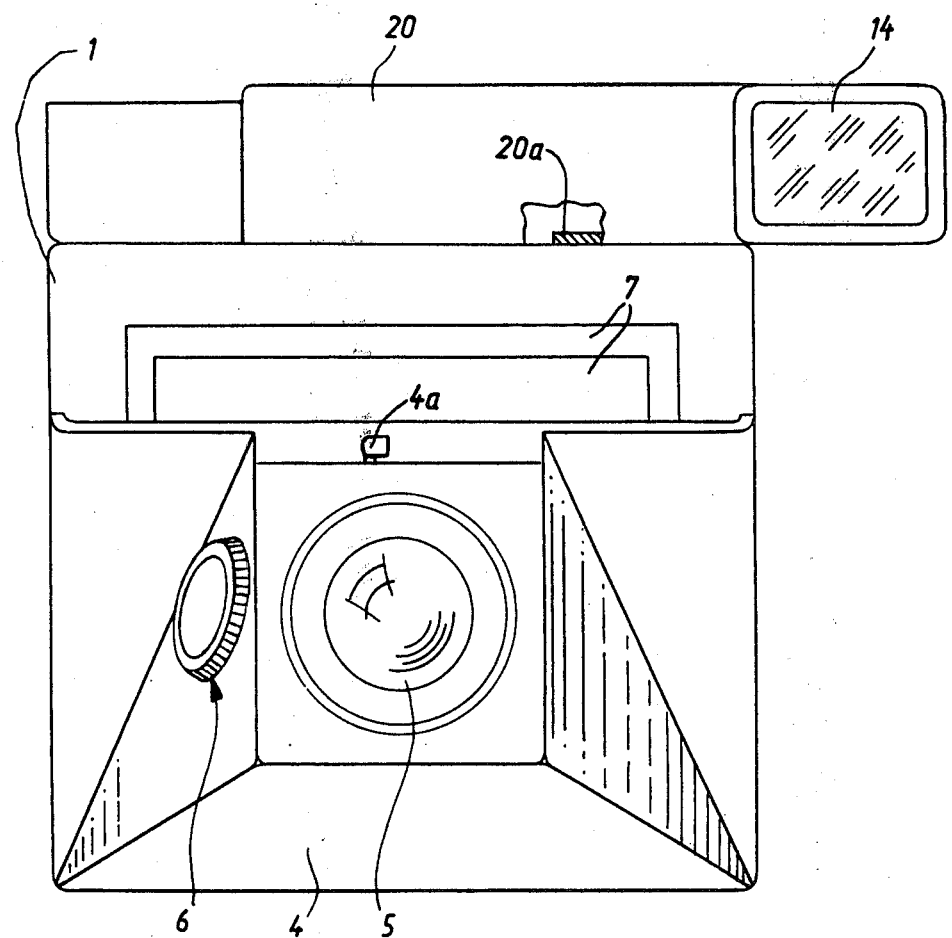
FIG. 3 is a front view of the same camera, but illustrating it in open (i.e., operative) position.

A cap 20 of channel-shaped cross-section (preferably of a cross-section resembling an inverted letter U) straddles the upper end of body 1 and is slidable transverse to the optical axis of lens 5 (i.e., normal to the plane of FIG. 4). In the closed position of the camera the cap 20 coextends with the upper end of body 1 (FIG. 1); when the camera is opened and cap 20 is shifted to the position of FIG. 3, one end portion of the cap projects laterally beyond the body 1 (FIG. 3). This end portion has mounted in it a view finder 14 (preferably of the direct-view or eyelevel type as seen in FIG. 6) which is exposed for use when the cap is in the position of FIG. 3 but is blocked by the body 1 when the cap assumes the position of FIG. 1. Thus, when the camera is in the closed position of FIG. 1, the viewfinder 14 requires no additional space because it does not project beyond the outline of the camera.

The cap 20 is provided with a slot S' for passage of the pictures (i.e., the exposed film sheets 72) which exit through slot S of body 1. The inner surface of the top wall of cap 20 has guide grooves 15 which are located laterally of the slot S'; below this top wall is located a plate 16 which is slidable lengthwise of the optical axis of lens 5 (i.e., transverse to the elongation of cap 20) and for this purpose is guided in grooves (not shown) of cap 20 or otherwise slidably held therein (it could be guided on the top surface of body 1 instead). The plate 16 has pins or other projections 17 which extend into the grooves 15 (evidently, the pins could be on cap 20 and the grooves on the plate 16). The grooves 15 are curved in such a manner (FIG. 6) that when cap 20 is shifted from the position of FIGS. 3, 6 to the position of FIG. 1 (i.e., when the camera is placed in rest or storage position) this results in automatic movement (due to the cooperation of grooves 15 and pins 17) of the plate 16 from a position laterally adjacent the slots S, S' to a position in which the plate lies directly above slot S and below slot S', thus blocking slot S and protecting it against the entry of dust and other contaminants.

Figure 5:
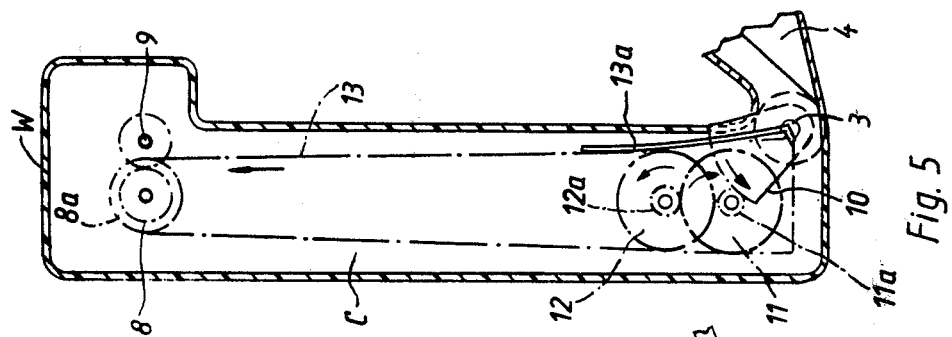
FIG. 5 is a fragmentary vertical section through a part of the camera body, illustrating interior components.
Figure 5A:
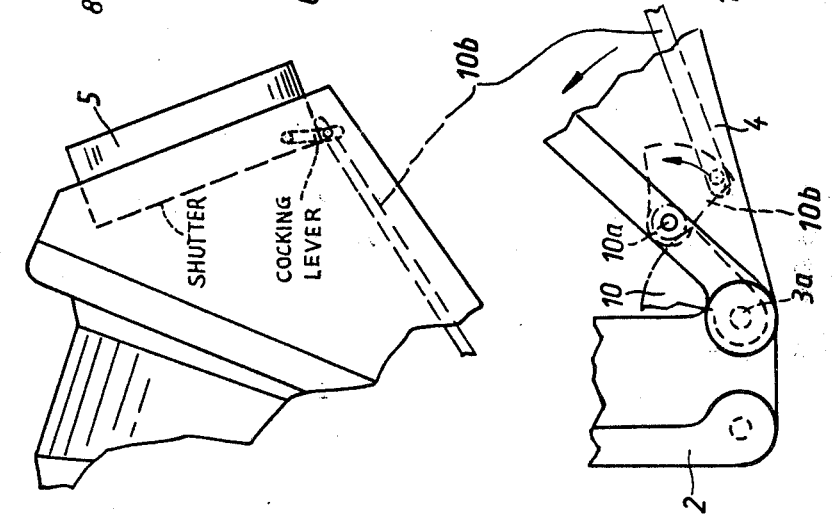
FIG. 5a is a fragmentary vertical section, on an enlarged scale, illustrating a detail of a shutter-cocking mechanism.

Control elements are provided on the rigid lens mount 4, i.e., on the peripheral wall which bounds the hollow interior of this mount. In the illustrated embodiment these elements comprise a knurled turnable knob 6 which is connected in a manner known per se (and therefore not illustrated) to the lens so as to permit focus adjustments; set into the center of knob 6 (not necessarily turnable therewith) is a shutter release 6a, for example of the diaphragm type (known per se) which is connected with the not-illustrated shutter mechanism that is accommodated in the interior of lens mount 4. A transmission is provided for driving at least one of the rollers 8, 9 so as to cause these (nip) rollers to advance the film sheets 72 through slots S, S' while squeezing developer from the respective pouches 73. For this purpose a gear segment 10 is secured on lens mount 4 (FIGS. 5, 5a) to turn about the axis 3a when the lens mount is pivoted about the same. Segment 10 meshes with a pinion 11a of a gear 11 which in turn meshes with a pinion 12a of another gear or sprocket 12. A toothed belt is trained about sprocket 12 and about a sprocket of one of the rollers 8, 9, here about sprocket 8a of roller 8. Thus, roller 8 is rotated when sprocket 12 turns. A freewheeling device (known from some cameras with rapid film wind levers and therefore not illustrated) or another device allowing movement of transporting rollers only in one direction, as known from U.S. Pat. Nos. 2,830,776 or 2,682,999 e.g., is provided which assures that roller 8 is rotated only when the lens mount 4 pivots either towards open position or — preferably — towards closed position. Since the rollers 8, 9 must squeeze developer from the pouches 73, which requires a certain amount of force, it is advantageous if the arrangement is such that motion is transmitted to roller 8 when the lens mount 4 is pivoted to its closed position since a user can exert greater force when closing the camera than when opening it. A gripper 13a (e.g., hook or claw) is provided which pulls successive film sheets 72 from the film pack FK and feeds them to the rollers 8, 9. The gear segment 10 can also be utilized (FIG. 5a) to cock the (not illustrated) shutter meachnism by a rod 10b. For this purpose it may mesh with a pinion 10a of a second gear segment 10b which is turnably mounted inside the lens mount 4 and which in turn meshes with a further gear (not shown) or which moves a rod 10b from which motion is transmitted to the shutter-cocking mechanism. This transmission of motion by segment 10 to pinion 10a advantageously takes place when the camera is being opened, i.e., during movement of lens mount 4 from the position of FIG. 1 to the position of FIG. 4 (see the arrow on segment 10b) but it could also take place during the closing movement. In the latter case, however, the user would have to supply sufficient force both to drive the roller 8 and to cock the shutter mechanism which is somewhat burdensome (becomes tiring).

The cap 20 has the additional purpose of locking or latching the lens mount 4 in the closed position of the camera (FIG. 1). For this purpose suitable hooks 4a and eyes 20a or equivalent detent portions are provided.

It will be evident that when the camera is in closed position all of its sensitive components — such as slot S and bellows 7 — are fully protected. The lens 5 may be provided with a separate snap-on or screw-on cover for protection. Biasing means (e.g., a leaf spring) may be provided which permanently bias the lens mount 4 towards the open position shown in FIG. 4, so that the camera opens automatically when the cap 20 is moved from the position of FIG. 1 to the position of FIG. 3 with concomitant disengagement of the detent portions. Because the bellows 7 necessitates pressure compensation, air channels (not shown) are provided which communicate the interior of the camera with the atmosphere. Mechanisms for preventing double exposures and the like are also provided; these are known per se and form no part of the invention. The same is true of a shutter-release lock which is activated when the camera is placed in closed position.

The invention is susceptible of various modifications. For example, the arrangement for rotating the rollers 8 and/or 9 can be constructed differently from one which is illustrated. What counts is that it be of such construction that the relatively small (pivotal) movement performed by lens mount 4 when the same is moved between the open and closed positions is transformed into a rotational movement of rollers 8 and 9 which lasts long enough for these rollers to transport the respective film sheets 72 over the entire length of the same, i.e., to draw them through and expel them upwardly from the nip defined between these rollers.

While the invention has been illustrated and described as embodied in an instant-picture camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An instant-picture camera of the type using a film pack which comprises rectangular film sheets each of which is provided with a supply of developer in a compartment extending along one of the narrow edges of the sheet and arranged to be squeezed upon exposure of the sheet, said camera comprising a camera body having an upper end provided with a slot for discharging of exposed sheets, and a film chamber dimensioned to receive a film pack with said compartments located beneath and adjacent to said slot; a cover for said film chamber to permit insertion and removal of the film pack; a lens on said camera body and having an optical axis; a cap straddling said upper end of said camera body and being slidable therein in direction transverse to said optical axis; and a viewfinder mounted in said cap.

2. A camera as defined in claim 1, wherein said cap is elongated and of inverted-U channel-shaped cross-section.

3. A camera as defined in claim 2, said cap having an end portion and said viewfinder being mounted in said end portion, and wherein said cap is slidable between a position in which said end portion is located laterally of said camera body and said viewfinder is exposed and another position in which said cap coextends with said camera body and said viewfinder is blocked by the same.

4. A camera as defined in claim 3, wherein said viewfinder is a direct-view finder.

5. An instant-picture camera of the type using a film pack which comprises rectangular film sheets each of which is provided with a supply of developer in a compartment extending along one of the narrow edges of the sheet and arranged to be squeezed upon exposure of the sheet, said camera comprising a camera body having an upper end provided with a slot for discharging of exposed sheets, and a film chamber dimensioned to receive a film pack with said compartments located beneath and adjacent to said slot; a cover for said film chamber to permit insertion and removal of the film pack; a lens on said camera body and having an optical axis; a channel-shaped cap straddling said upper end of said camera body and being slidable thereon transverse to said optical axis between one position in which it coextends with said upper end and an other position in which an end portion of said cap extends laterally beyond said upper end; and means for blocking said slot when said cap is in said one position and for unblocking said slot in response to movement of said cap to said other position.

6. A camera as defined in claim 5, said means comprising a slidable plate retained in said cap for shifting movement lengthwise of said optical axis, and cooperating guide portions on said cap and plate for shifting said plate to a location overlying said slot when said cap is in said one position and to a location laterally adjacent said slot when said cap is in said other position.

7. A camera as defined in claim 6, wherein said guide portions comprise curved cam grooves in one of said cap and plate and follower projections on the other of said cap and plate and extending into said cam grooves.

8. An instant-picture camera of the type using a film pack which comprises rectangular film sheets each of which is provided with a supply of developer in a compartment extending along one of the narrow edges of the sheet, said camera comprising a camera body having an upper end provided with a slot for discharging of exposed sheets, and a film chamber dimensioned to receive a film pack with said compartments located beneath and adjacent to said slot; a cover for said film chamber to permit insertion and removal of the film pack; a rigid lens mount; means mounting said lens mount on said camera body for pivoting movement relative to the same between a retracted rest position and an extended operating position; a lens on said lens mount and having an optical axis; and a channel-shaped cap straddling said upper end of said camera body and being slidable thereon transverse to said optical axis between one position in which it retains said lens mount in said rest position and another position in which it permits pivoting of said lens mount to said operating position.

* * * * *